United States Patent [19]

Gerardot et al.

[11] 4,315,099

[45] Feb. 9, 1982

[54] FLEXIBLE TRANSMISSION LINE FOR A FLUID AND FOR ELECTRIC SIGNALS

[75] Inventors: Claude Gerardot, Sartrouville; Georges Romero, Massy, both of France

[73] Assignee: Commissariat a l'Energie Atomique, Paris, France

[21] Appl. No.: 109,064

[22] Filed: Jan. 2, 1980

[30] Foreign Application Priority Data

Jan. 12, 1979 [FR] France .................. 79 00750

[51] Int. Cl.³ .................. F16L 11/12; H01B 7/18
[52] U.S. Cl. .................. 174/47; 57/216; 57/220; 57/221; 138/172; 174/106 R; 174/106 D; 174/107
[58] Field of Search .................. 174/15 C, 24, 27, , 174/47, 102 D, 102 E, 106 R, 106 D, 107, 108, 113 R, 113 C, 116, 117 F, 128 R, 129 R, 130, 131 R, 131 A; 57/213, 214, 216, 217, 218, 220, 221; 138/111, 153, 172

[56] References Cited

U.S. PATENT DOCUMENTS

| 883,759 | 4/1908 | Tangring | 174/131 A X |
| 989,532 | 4/1911 | Macduffee | 174/47 |
| 2,531,917 | 11/1950 | Mollerhoj et al. | 174/106 R X |
| 3,605,398 | 9/1971 | Carlson et al. | 57/217 |

FOREIGN PATENT DOCUMENTS

| 599736 | 7/1934 | Fed. Rep. of Germany | 174/47 |
| 889768 | 9/1953 | Fed. Rep. of Germany | 174/15 C |
| 2252924 | 5/1974 | Fed. Rep. of Germany | 174/15 C |
| 52-25280 | 2/1977 | Japan | 174/15 C |

Primary Examiner—Laramie E. Askin
Attorney, Agent, or Firm—Kerkam, Stowell, Kondracki & Clarke

[57] ABSTRACT

Flexible transmission line, wherein it comprises a fluid circulation duct and reinforcements inside and outside the said duct against compressive forces inside and outside the duct, the internal reinforcement comprising at least one cable within said duct, whereby within said duct over the entire length of the line the cable leaves fluid circulation spaces, while the external reinforcements are coaxial to the duct.

15 Claims, 6 Drawing Figures

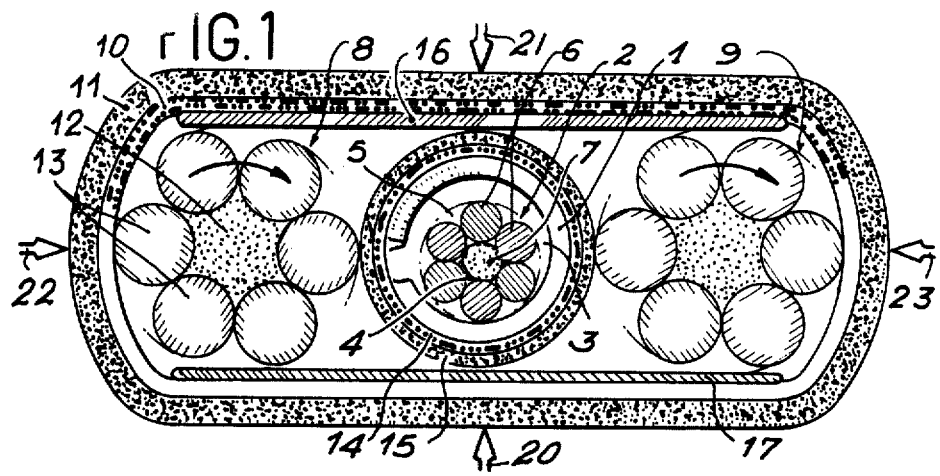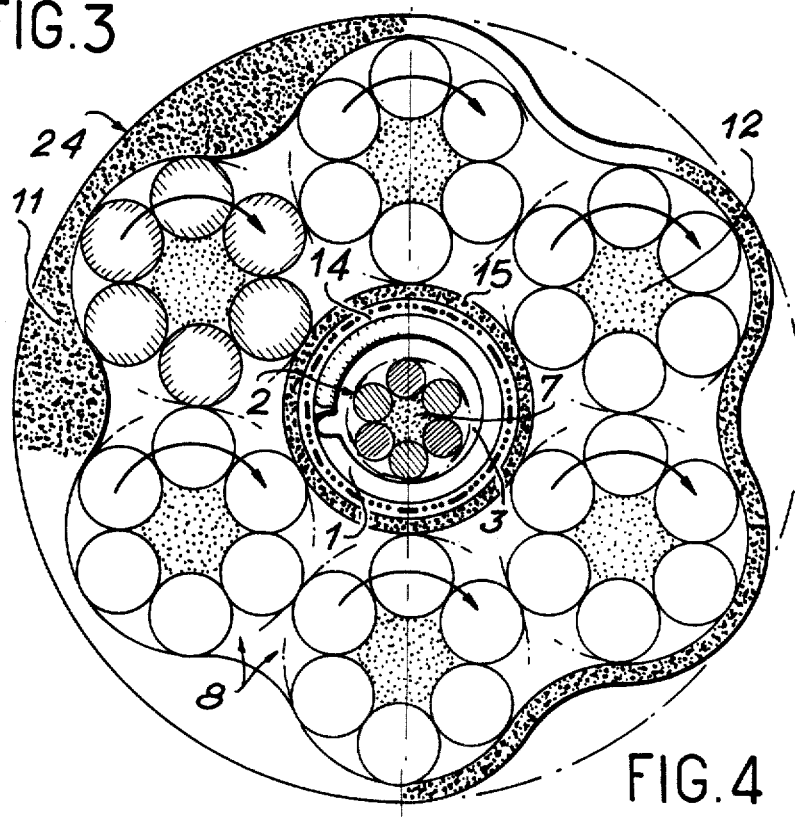

FLEXIBLE TRANSMISSION LINE FOR A FLUID AND FOR ELECTRIC SIGNALS

BACKGROUND OF THE INVENTION

The present invention relates to a flexible transmission line.

This line permits the transfer of liquid or gaseous fluid samples and optionally the transmission of electrical signals over long distances, said liquid or gaseous samples, as well as said electrical signals possibly come from deep underground or underwater deposits, such as for example oil deposits. This transmission can be continuous or discontinuous.

The transmission lines for liquid or gaseous fluids and optionally electrical signals from remote underground or underwater deposits generally have very complex constructions. Over a long period of time they must be kept in a good state of preservation and sealing, whilst resisting any creep due to internal or external compression. Internal compression can be caused by the transported fluids and external compression can be caused, for example, by the pressure of water in the case of underwater lines or by underground explosions of a natural or artificial nature in the case of underground lines. The length of these transmission lines can reach several hundred meters and they must be flexible in order to permit their winding onto drums on the surface of the ground or the ocean. The known transmission lines do not make it possible to solve all the problems referred to hereinbefore and their very complex construction makes their manufacturing cost high.

BRIEF SUMMARY OF THE INVENTION

The present invention aims at obviating these disadvantages and more particularly aims at providing a very long flexible, tight, transmission line which has a good resistance to crushing, as well as to internal compressive forces.

The invention relates to a flexible transmission line, wherein it comprises a fluid circulation duct and reinforcements inside and outside the said duct against compressive forces inside and outside the duct, the internal reinforcement comprising at least one cable within said duct, whereby within said duct over the entire length of the line the cable leaves fluid circulation spaces, whilst the external reinforcements are coaxial to the duct.

According to a special feature of the invention the internal reinforcement cable is a flexible cable comprising a central core surrounded by strands.

According to another feature of the invention and for a first embodiment thereof the duct is an undulating tube having the form of a hollow screw with a helical internal pitch and a helical external pitch.

According to another feature of the invention for this first embodiment the external reinforcement of the transmission line is a structure with slings tangential to the duct and surrounded by a sleeve making it possible to maintain the contact between the duct and the slings.

According to a special feature the external reinforcement structure has two slings which are tangential and parallel to the duct in such a way that the axis of these slings and the axis of the duct are in the same plane. Lateral reinforcement hoops are placed in two planes parallel to the axial plane on either side of the duct and the slings.

According to another feature of the invention and for a second embodiment thereof the external reinforcement structure has a plurality of slings tangential to the duct and twisted around the duct. These slings can be tangential to one another.

According to another feature of the invention and in a third embodiment thereof the cable within the duct is an antigyratory cable in contact with said duct and said antigyratory cable comprises, stranded on a central core, concentric layers stranded in one direction and other concentric layers stranded in the opposite direction.

According to another feature of the invention and for a fourth embodiment thereof slings acting as spacers are positioned between the antigyratory cable and the duct.

BRIEF DESCRIPTION OF THE DRAWINGS

The invention is described in greater detail hereinafter relative to non-limitative embodiments and the attached drawings, which show:

FIG. 1 diagrammatically a first embodiment of a transmission line according to the invention shown in cross-sectional form.

FIG. 2 a lateral diagrammatic view of duct 1 of FIG. 1.

FIG. 3 diagrammatically the lateral reinforcement hoops of the line of FIG. 1.

FIG. 4 diagrammatically a second embodiment of a transmission line according to the invention, said line being shown in cross-sectional form.

DETAILED DESCRIPTION OF THE PREFERRED EMBODIMENTS

Figure 5:
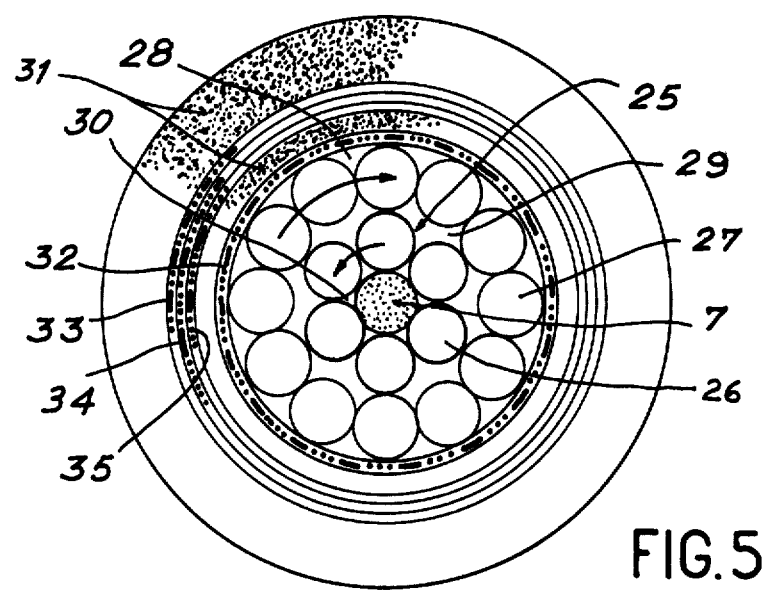
FIG. 5 diagrammatically a third embodiment of a transmission line according to the invention in cross-sectional form.

FIG. 1 shows in a diagrammatic cross-sectional view a transmission line according to a first embodiment of the invention. This transmission line has a duct 1 for the circulation of liquid or gaseous fluids and reinforcements inside and outside said duct. These reinforcements will be described in greater detail hereinafter and make it possible for the duct to resist internal and external compressive forces. The internal reinforcement has at least one cable 2 within the duct. This cable makes it possible to prevent the total crushing of the duct and its diameter is smaller than that of the duct leaving a space 3 for the circulation of fluids within the duct. In the case of crushing of the duct by external compressive forces, the continuity of fluid circulation is ensured in spaces such as 4, 5 existing between strands 6 and between said strands and the central core 7 of cable 2. Cable 2 is a flexible cable constituted by six strands 6 surrounding the central core 7. This central core can be made from an artificial or natural textile material, such as for example hemp. In certain special applications in which the line is required to transmit electrical signals in addition to the transportation of fluids, the central core may comprise a flexible electrical cable, which is obviously electrically insulated from the surrounding strands and makes it possible to transmit electrical signals between a remote deposit and a transmission or reception station. Strands 6 are metal strands, for example of galvanized steel. These strands can be constituted by 36 wires, which are not shown in the drawing. Duct 1 is an undulating duct, whose cross-section has the form of a hollow screw with a helical internal pitch and a helical external pitch, giving the duct a good flexibility, a high resistance to stresses and in particular to external compressive forces. If the duct 1 is crushed and, after deformation, comes into contact with cable 2, due to the fact that the helical pitches of duct 1 and of stranded cable 2 cooperate there is still a passage zone for the circulating fluid between duct 1 and cable 2. Thus, as a result of its stranded form cable 2 mainly serves to prevent the stoppage of fluid circulation in the case of the duct being crushed. This duct is preferably made from galvanized steel or stainless steel. The external reinforcements of the transmission line in this first embodiment comprise a structure with two slings 8, 9. These slings are tangential to duct 1 and are surrounded by a sleeve having a layer 10 of a braided material covered with another layer 11 of a flexible material. The braided material layer is a metal braid, preferably made from stainless steel. The flexible material layer is a layer of a synthetic material, such as polyvinyl chloride or rubber. In this first embodiment the external reinforcing structure also has two slings, each having a flexible central core 12 surrounded by strands 13. These slings are coaxial to duct 1. Their longitudinal axes, like the axis of duct 1 are located in the same plane in such a way that they are parallel to the duct. The central core 12 is made from a flexible material such as, for example, hemp, whilst the strands 13 are made from steel. Each sling has, for example, six strands of 36 wires, not shown in the drawing. The contact between duct 1 and slings 8, 9 is provided by means of a protective sheath which surrounds the duct and has at least one layer of braided material. In the embodiment shown in the drawing the protective sheath has two layers 14, 15. Layer 14 is a braided layer of a metallic material, e.g. stainless steel, whilst layer 15 is a layer of flexible material, such as e.g. polyvinyl chloride or rubber. These two layers ensure a good contact between the duct and the slings and also enable the duct to better resist internal compressive forces due to the fluid circulating in the duct. The external reinforcement of the line is improved as a result of two lateral hoops 16, 17 disposed in two planes parallel to the axial plane of the duct and the slings on either side of said duct and of said slings. These hoops are tangential to slings 8, 9 and to the protective sheath of duct 1. They are held in place by layer 10 of the sleeve, which surrounds the duct and the slings over the entire length of the transmission line. As will be shown hereinafter these hoops are transversely cut in such a way as to constitute partly overlapping portions in a so-called "flake" arrangement. They are preferably made from stainless or galvanized steel.

FIG. 2 shows a diagrammatic lateral view of duct 1, whose undulations preferably have a sinusoidal cross-section. These undulations within and without the duct give the latter a cross-section in the form of a hollow screw with a helical internal pitch and a helical external pitch.

FIG. 3 diagrammatically shows in plan view two portions 18, 19 of one of the hoops 16 or 17 of FIG. 1. This drawing better shows the so-called "flake" arrangement. The thus cut hoops aid the flexibility of the transmission line, which is very useful when winding the line onto a drum. The ends of each portion of hoop have a rounded shape, so that during the winding of the line onto a drum said ends do not damage the braided material 10 which covers the hoops.

According to this first embodiment of the transmission line, the resistance to external or internal compressive forces is ensured by internal cable 2, slings 8, 9, hoops 16, 17, as well as the various layers of braided material surrounding the duct, slings and hoops. During an internal compression the deformation of the duct is minimised due to its undulations and due to the layer of braided material 14, round slings 8, 9 and hoops 16, 17 held in place by braid 10. During an external compression in the direction of arrows 20, 21, for example, hoops 16, 17 bear on slings 8, 9 and through cooperating with the undulations of duct 1 prevent the crushing of the latter. If external compression occurs in the direction of arrows 22, 23, slings 8, 9, via hoops 16, 17, lead to a rotation of 90° of the system around duct 1. Thus, the situation is of stresses in the direction of arrows 20, 21. It is obvious that the duct is also protected from crushing by the internal cable 2.

Duct 1 can be manufactured in the form of limited length elements, for example six meters. These elements are joined end to end by plasma-arc welding or by silver brazing in such a way as to obtain very considerable duct lengths. The circular interrupted lines surrounding the cable and the slings are fictional lines defining the overall dimensions of the cable and said slings.

FIG. 4 shows a second embodiment of a transmission line according to the invention in a diagrammatic cross-sectional form. The same elements carry the same reference numerals as in FIG. 1. Duct 1, internal cable 2 and the protective sheath constituted by layers 14, 15 are made in the same way as the corresponding elements of FIG. 1. In this second embodiment the external reinforcing structure has a plurality of slings 8 having the same structure as slings 8 of FIG. 1. The slings are tangential to duct 1 and in contact with the latter via the surrounding sheath. They are preferably tangential to one another and are helically twisted around duct 1. Six slings are shown, but it is obvious that this number can differ. They are held in place by a sleeve having a layer 11 of a flexible material, such as polyvinyl chloride or rubber for example. It is obvious that the sleeve could have a layer of a braided material, not shown in the drawing. The outer surface 24 of layer 11 can either be circular, indicated by a continuous line circle, or undulated, shown by a broken line. In this embodiment of the transmission line any compressive force tending to crush the line contributes to the buttressing of each of the slings with respect to one another and as a result said slings oppose the crushing of the central duct. As the slings are arranged coaxially with respect to the central duct, if one of the slings is crushed, assuming a more or less ellipsoidal shape, whose major axis is perpendicular to the axial direction of the duct, the two surrounding slings tend to become deformed in a direction perpendicular to the contact surface with the central sling. The compressive force on the duct is consequently reduced. Thus, the external compressive forces are dispersed in the various slings. As for the line shown in FIG. 1 the central cores 7 and 12 of cable 2 and the slings 8 are flexible, whereby said central cores can be made from a textile material such as hemp. For certain special applications the central core 7 of cable 2 can be flexible electric cable, electrically insulated from the strands surrounding it and serving for the transmission of electrical signals.

FIG. 5 shows a third embodiment of a transmission line according to the invention. In this embodiment the internal reinforcement is constituted by an antigyratory cable 25 in contact with the fluid circulation duct. The construction of this duct will be described in greater detail hereinafter. The antigyratory cable has several concentric layers of strands 26, 27 around the central core 7. In a more general manner the antigyratory cable 25 has, twisted onto a central core, a certain number of layers twisted in one direction, as well as a certain number of layers, which is not necessarily the same as the first, twisted in the other direction. This antigyratory cable prevents rotations of the transmission line about its axis when said line is under load. It is constructed in per se known manner by twisting strands 26 around the central core in one direction and by twisting strands 27 in a second direction, which is opposite to the first direction. In addition to its antigyratory property the main interest of this cable is that it has a porosity close to 30% of its cross-section and thus provides the circulating fluid with a greater passage cross-section. This porosity is clearly shown in the drawing and is due to gaps such as 28, 29, 30 between the strands of the cable and between the strands of the outer layer and the duct. As in the preceding embodiments, the strands of cable 25 can be constituted by steel wires, preferably stainless or galvanized steel wires. The central core 7 of the cable comprises a strand and can also comprise an electrical cable, which is electrically insulated from the strands surrounding the same and which permits the transmission of electrical signals in certain special applications.

The duct permitting the circulation of fluids comprises a layer 31 of a flexible material surrounding cable 25. This transmission line, as in the preceding embodiments, also has external reinforcements, more particularly in the form of a sleeve 32 positioned between duct 31 and cable 25. This sleeve is made from a braided metallic material, for example stainless or galvanized steel. The external reinforcements of the transmission line also have at least one reinforcing layer embedded in the flexible layer 31 constituting the duct. The drawing shows three of these layers 33, 34, 35 embedded in layer 31; they are in the form of metallic braids, for example of galvanized or stainless steel. The flexible layer 31 forming the duct is made for example from polyvinyl chloride or rubber. It is obvious that the number of reinforcing layers can differ from that indicated and they can also have a different positioning within the flexible layer 31 forming the duct. These layers can optionally be separated within the layer 31. It is also obvious that although in the embodiment shown the antigyratory cable has only two layers of strands, the number of said layers can be much greater. No matter what the external compressive forces the fluid can continue to circulate within the duct, due to the considerable porosity thereof resulting mainly from the construction of the antigyratory cable which it contains. The strands 26, 27 of the antigyratory cable can be constituted in the same way as the strands 6 of cable 2 of FIG. 1.

Figure 6:
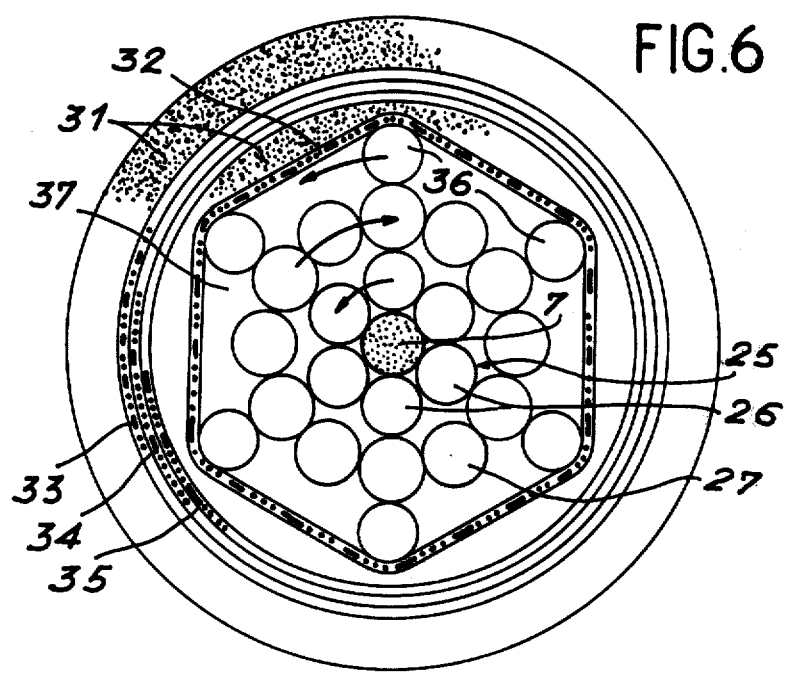
FIG. 6 diagrammatically a fourth embodiment of a transmission line according to the invention in cross-sectional form.

FIG. 6 shows a fourth embodiment of a transmission line according to the invention. This transmission line is shown in cross-sectional form and the same components carry the same reference numerals as in FIG. 5. The antigyratory cable 25, in the same way as the antigyratory cable of the previous figure comprises two layers of strands 26, 27, twisted in opposite directions about the central core 7. These strands and this central core are made from the same materials as the strand and central core of FIG. 5. In this fourth embodiment of the transmission line according to the invention the slings 36, which are tangential to the antigyratory cable 25 and are spaced therefrom, are stranded around the cable 25 and are held in place by sleeve 32, made as in the previous case from a metallic braid. These slings form contact spacers between the antigyratory cable and the duct. They serve to increase the porosity of the duct by creating a supplementary space 37 between the duct and the antigyratory cable. As in the previous embodiment there is a duct 31 and reinforcements constituted by braided material layers 33, 34, 35. The slings 36 are preferably regularly spaced about the antigyratory cable and are made from galvanized or stainless steel wires and their twisting direction is preferably opposite to that of the layer of strands 27 of the antigyratory cable. In the embodiment shown their number is limited to 6, but it is obvious that this number can be increased or decreased. The transmission line shown in this fourth embodiment ensures a better circulation of fluids, due to the presence of slings 36, permitting a significant increase in the fluid passage cross-section.

For the embodiments of the transmission line shown in FIGS. 5 and 6 it is possible to manufacture very long lines, of for example 1,000 meters, which can easily be wound onto drums due to their flexibility. In the embodiment shown in FIG. 6 an external compressive force cannot prevent the circulation of fluids due to the presence of the antigyratory cable and the slings, which ensure that the duct has a satisfactory porosity.

The transmission line described hereinbefore makes it possible to achieve the objectives indicated hereinbefore and particularly ensures the continuity of circulation of fluids within the line, no matter what the crushing forces to which said line can be exposed.

The invention is not limited to the embodiments described and represented hereinbefore and various modifications can be made thereto without passing beyond the scope of the invention.

What is claimed is:

1. A flexible transmission line comprising a fluid circulation duct and reinforcements inside and outside said duct against compressive forces inside and outside the duct, the internal reinforcement comprising at least one cable within said duct, whereby within said duct over the entire length of the line the cable provides fluid circulation spaces, the external reinforcements being coaxial to the duct, the internal cable being a flexible cable constituted by a central core surrounded by strands, the duct being an undulating tube, whose longitudinal section is in the form of a hollow screw with helical internal pitch and helical external pitch, and the external reinforcement being a structure with slings tangential to the duct and surrounded by a sleeve for maintaining contact between the duct and the slings.

2. A flexible transmission line according to claim 1, wherein a protective sheath surrounds the duct between the latter and the slings.

3. A flexible transmission line according to claim 2, wherein the slings have a flexible central core surrounded by strands.

4. A flexible transmission line according to claim 3, wherein the structure with slings has two slings tangential and parallel to the duct, the axes of said slings and the axis of the duct being positioned in the same axial plane.

5. A flexible transmission line according to claim 4, wherein lateral reinforcing hoops are arranged in two planes parallel to the axial plane on either side of the duct and the slings so as to be tangential to the slings and to the protective sheath of the duct, said hoops being held in the sleeve right along the said line.

6. A flexible transmission line according to claim 5, wherein each hoop is cut transversely so as to form partly overlapping hoop portions, giving a so-called "flake" arrangement.

7. A flexible transmission line according to claim 6, wherein the protective sheath surrounding the duct has at least one braided material layer.

8. A flexible transmission line according to claim 7, wherein the sleeve has a flexible material layer.

9. A flexible transmission line according to claim 8, wherein the protective sheath surrounding the duct also has a flexible covering which covers the braided material layer.

10. A flexible transmission line according to claim 9, wherein the central core of the internal cable is electrically insulated from the strands surrounding it and is able to carry electrical signals.

11. A flexible transmission line according to claim 8, wherein the sleeve also has a braided material layer covered by the flexible material layer.

12. A flexible transmission line according to claim 3, wherein the structure with slings has a plurality of slings tangential to the duct and twisted around said duct.

13. A flexible transmission line according to claim 12, wherein the slings are tangential to one another.

14. A flexible transmission line, wherein it comprises a fluid circulation duct and reinforcements inside and outside the said duct against compressive forces inside and outside the duct, the internal reinforcement comprising at least one cable within said duct, whereby within said duct over the entire length of the line the cable leaves fluid circulation spaces, while the external reinforcements are coaxial to the duct, wherein the internal cable is a flexible cable constituted by a central core surrounded by strands, wherein the internal cable is an antigyratory cable in contact with the duct with, twisted onto a central core, concentric layers twisted in one direction and other concentric layers twisted in the opposite direction, wherein the external reinforcements comprise at least one sleeve located between the duct and the antigyratory cable, said sleeve having at least one braided material layer, and at least one reinforcing layer of braided material embedded in a flexible material layer of the duct.

15. A flexible transmission line according to claim 14, wherein slings tangential to the antigyratory cable and spaced from one another are twisted around said cable and are held in place by the sleeve, said slings constituting contact spacers between the antigyratory cable and the duct.

* * * * *